United States Patent [19]
Poe

[11] 3,964,364
[45] June 22, 1976

[54] INITIALLY SINGLE PIECE ROTATABLE FASTENER

[75] Inventor: L. Richard Poe, Placentia, Calif.

[73] Assignee: Hartwell Corporation, Placentia, Calif.

[22] Filed: Apr. 17, 1975

[21] Appl. No.: 568,909

[52] U.S. Cl. ................................ 85/72; 24/73 P; 24/221 R; 85/5 R
[51] Int. Cl.² ........................................ F16B 13/04
[58] Field of Search ............ 85/72, 84, 83, 82, 5 R, 85/5 P, 45; 24/221 R, 221 A, 211 R, 211 L, 73 P, 73 PF

[56] References Cited
UNITED STATES PATENTS

| | | | |
|---|---|---|---|
| 2,304,704 | 12/1942 | O'Leary | 85/45 |
| 3,112,547 | 12/1963 | Poe | 85/5 R X |
| 3,116,528 | 1/1964 | Poe | 85/5 R X |
| 3,272,061 | 9/1966 | Seckerson | 24/221 R X |
| 3,319,510 | 5/1967 | Rapata | 85/72 |
| 3,344,488 | 10/1967 | Texier | 24/221 R |
| 3,417,438 | 12/1968 | Schuplin | 85/72 X |
| 3,568,263 | 3/1971 | Meehan | 85/72 X |
| 3,918,130 | 11/1975 | Poe | 24/73 P |

FOREIGN PATENTS OR APPLICATIONS

| | | | |
|---|---|---|---|
| 1,187,430 | 4/1970 | United Kingdom | 85/5 R |
| 971,370 | 9/1964 | United Kingdom | 85/72 |
| 3,209 | 2/1899 | United Kingdom | 85/45 |

*Primary Examiner*—Ramon S. Britts
*Attorney, Agent, or Firm*—Lyon & Lyon

[57] ABSTRACT

A fastener for joining sheet material having mating perforations, the fastener including a grommet and stud; the grommet having a head provided with an opening therethrough and a pair of spreadable stem elements; the stud being initially attached at one end integrally to the grommet within the opening and arranged, when severed from the head, to move between the stem elements and to rotate thereby to spread the stem elements and lock the grommet in place within the mating perforations; the stud having a retainer channel and the grommet having retainer projections for reception in the channel to prevent disengagement of the stud from the grommet after being severed therefrom for relative movement.

14 Claims, 22 Drawing Figures

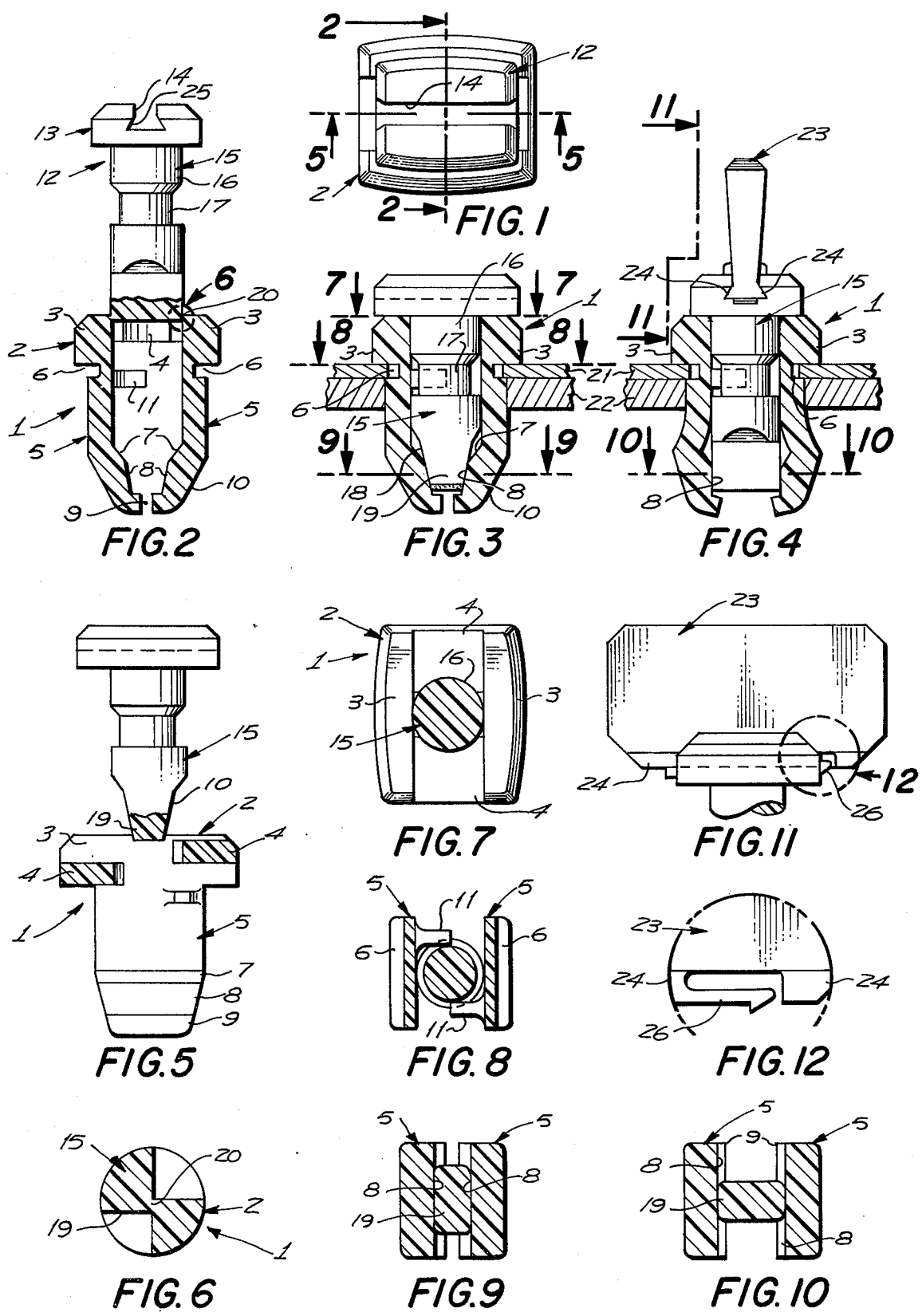

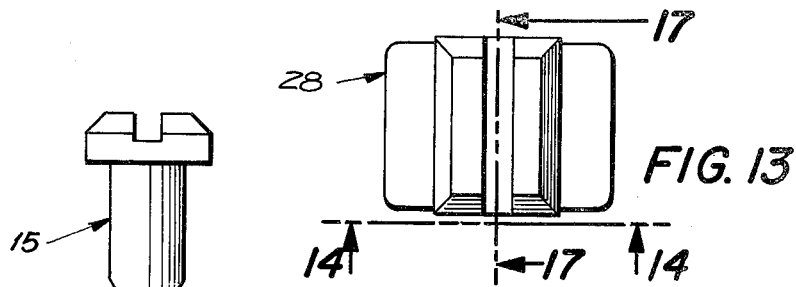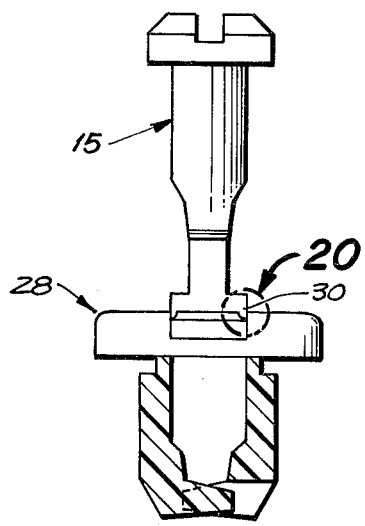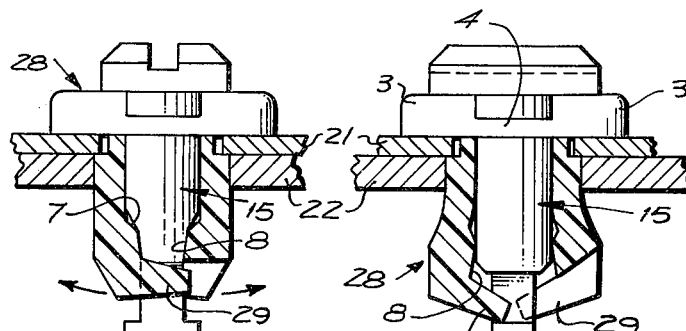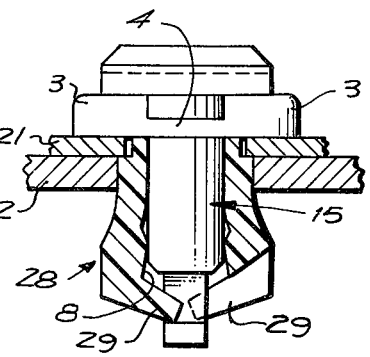
FIG. 13
FIG. 14  FIG. 15  FIG. 16
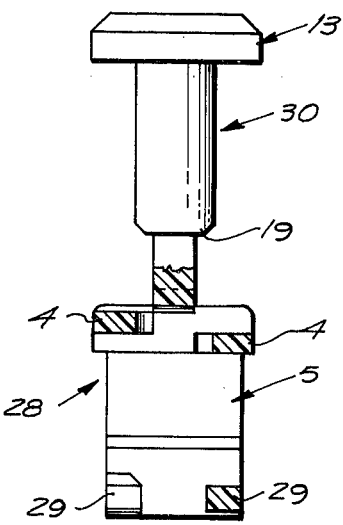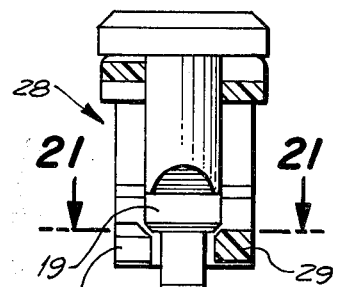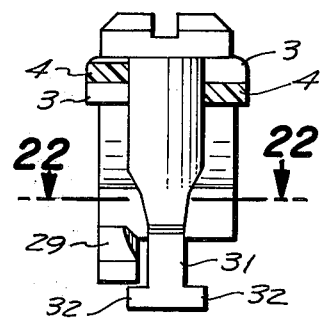
FIG. 17  FIG. 18  FIG. 19
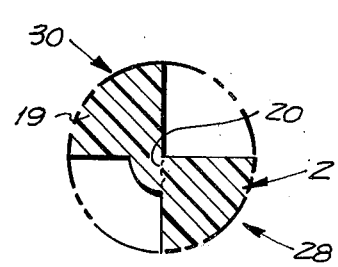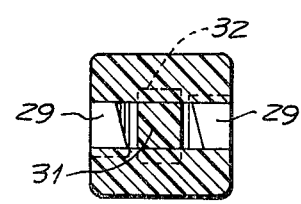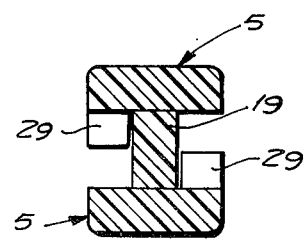
FIG. 20  FIG. 21  FIG. 22

INITIALLY SINGLE PIECE ROTATABLE FASTENER

BACKGROUND OF THE INVENTION

Applicant is the inventor of two piece fasteners comprising a grommet and a stud shown in U.S. Pat. Nos. 3,112,547 and 3,116,528 and an initially single piece fastener shown in a copending application Ser. No. 531,732 filed Dec. 11, 1974. In each construction the stud moves axially without rotation in order to secure or release the grommet.

SUMMARY OF THE INVENTION

The present invention is directed to fasteners for joining a pair of members having mating perforations of polygonal shape, and is summarized in the following objects:

First, to provide a fastener comprising a grommet and a stud molded in one piece, wherein after insertion of the grommet into the perforations, and subsequent severance of the stud, the stud is axially and rotationably movable relative to the grommet to secure or release the grommet with respect to the perforations.

Second, to provide a fastener, as indicated in the proceeding object, wherein the stud, once severed from its initial connection with the grommet and axially moved therein is automatically retained by the grommet, but restricted essentially to rotational movement thereto to secure and release the grommet.

Third, to provide a fastener initially formed in a single piece capable of being inexpensively formed by a pair of opposing die members without the need of cores.

Fourth, to provide a fastener, as indicated in the other objects, one embodiment is provided with interengaging elements located intermediate the extremities of the grommet and stud members, and another embodiment is provided with interengaging elements at the extremities thereof.

Fifth, to provide a fastener, as indicated in the other objects, in which the stud is provided with a slot to receive a screwdriver or similar turning tool, and is also arranged for separable interconnecting engagement with a novelly arranged handle.

BRIEF DESCRIPTION OF THE FIGURES

FIG. 1 is a plan view showing one embodiment of the initially single piece rotatable fastener, comprising a grommet and a stud.

FIG. 2 is a sectional view thereof, taken through 2—2 of FIG. 1, with portions of the stud shown in side elevation.

FIG. 3 is a sectional view of the grommet corresponding to FIG. 2, with the stud inserted therein and turned 90° from the position shown in FIG. 2, the grommet being shown inserted in a pair of perforated members.

FIG. 4 is a sectional view of the grommet corresponding to FIGS. 2 and 3, but with the stud turned 90° from the position shown in FIG. 3 causing expansion of the grommet; FIG. 4 also showing a removable turning handle supported by the head of the stud.

FIG. 5 is a sectional view taken through 5—5 of FIG. 1, with portions shown in side elevation.

FIG. 6 is a further enlarged fragmentary sectional view taken within circle 6 of FIG. 2, showing the initial connection between stud and grommet.

FIGS. 7, 8 and 9 are transverse sectional views taken through 7—7, 8—8 and 9—9 respectively of FIG. 3.

FIG. 10 is a transverse sectional view taken through 10—10 of FIG. 4.

FIG. 11 is a fragmentary side view taken from 11—11 of FIG. 4 showing the turning handle in side aspect.

FIG. 12 is a further enlarged side view of the handle taken within circle 12 of FIG. 11.

FIG. 13 is an enlarged plan view showing another embodiment of the initially single piece rotatable fastener, also comprising a stud and a grommet.

FIG. 14 is side view thereof taken from 14—14 of FIG. 13 showing the stud and grommet in their initial interconnected relation.

FIG. 15 is a side view corresponding to FIG. 14, but with the stud inserted in the grommet; the grommet being shown inserted through a pair of perforated members.

FIG. 16 is a side view corresponding to FIG. 15, but showing the grommet expanded to secure the members in to which it is inserted.

FIG. 17 is a sectional view taken through 17—17 of FIG. 13 with portions in side elevation, the stud and grommet being shown in their initial interconnected relation.

FIG. 18 is sectional view taken in the plane of FIG. 17 showing the stud and grommet at right angles to the position shown in FIG. 15.

FIG. 19 is sectional view corresponding to FIG. 17 and showing the stud and grommet in the position shown in FIG. 16.

FIG. 20 is an enlarged fragmentary sectional view taken within circle 20 of FIG. 14.

FIG. 21 is a transverse sectional view taken through 21—21 of FIG. 18.

FIG. 22 is a transverse sectional view taken through 22—22 of FIG. 19.

Referring first to the embodiment shown in FIGS. 1 through 12, the initially single piece rotatable fastener includes a grommet 1 having a rectangular head 2 including spaced side portions 3 joined by a pair of connecting webs 4 which are axially offset from each other.

A pair of stems 5 extend from the side portions 3 in essentially parallel spaced relation. At their junctures with the side portions 3 of the head 2, the stems are provided with grooves 6 which permit the stems to flex outwardly from each other. Near their extended ends the confronting inner sides of the stems 5 form converging cam faces 7 which merge into bearing faces 8, the lower extremities of the bearing faces are provided with inturned bosses 9. Externally in the regions of the bearing faces and bosses, the stems form tapered portions 10. Near their junctures with the head 2 the stems 5 are provided with a pair of inwardly extending spaced stud retainer tabs 11.

The fastener includes a stud 12 having a head 13 provided with a cross slot 14. Extending from the head 12 is a shank 15 including a circular portion 16, having an annular groove 17. Continuing from the lower end of the circular portion 16, the shank forms a pair of diametrically disposed tapered or converging side surfaces 18 terminating a rectangular end 19. The narrow edges of the rectangular end 19 are initially joined by frangible connecting webs 20 to the head 2 of the grommet adjacent to its upper surface as shown in FIGS. 2, 5 and 6.

The fastener is adapted to be received in a pair of perforated members 21 and 22. The perforations are rectangular and dimensioned to receive the stems 5. The perforation in the member 21 and the thickness of this member may be such as to interlock with the grommet, once the grommet is pressed therein, as shown in FIGS. 3 and 4.

Operation of the embodiment shown in FIG. 1 through 10 is as follows:

Initially the fastener is molded as a single piece. In this regard it should be noted that the connecting webs 4 and the tabs 11 are so arranged that the fastener may be cast between a pair of die members without the use of cores.

With the grommet and stud integrally connected as shown in FIGS. 2 and 5, the grommet is inserted in the perforations provided in the members 21 and 22. Once the grommet is in position sufficient axial force is applied to the stud 12, to sever the connecting webs 20. It will be noted that the wide dimension of the rectangular end 19 is in axial alignment with the cam faces 7 and bearing faces 8. Consequently, when the stud is initially severed and moved axially without turning, the final movement of the stud causes the grommet stems 5 to spread as shown in FIG. 4. The grommet may be subsequently removed form the perforated member 22 by turning the stud 12 from the positions shown in FIG. 4 to the position shown in FIG. 3.

During the course of movement of the stud 12 from the position shown in FIG. 2 to the position shown in FIG. 4, the shank 15 passes between the retainer tabs 11 spreading its tabs, then on continued movement of the stud the tabs are received in the retainer groove 17. Thus, once the stud 12 has been inserted into the grommet 1, it cannot be removed, but the grommet may be expanded or contracted by 90° rotation of the stud 12.

Rotation of the stud may be accomplished by a screwdriver or a coin inserted in the cross slot 14. As the fastener may be used repeatedly, it is desirable in some cases to provide a turning handle such as shown in FIGS. 4, 11 and 12. The turning handle, designated 23, is an essentially a rectangular member having lateral ribs 24 along one margin which are received in undercut channels 25 provided in the side walls of the cross slot 14. The edge portion of the handle provided with the ribs 24 may be provided with a latch finger 26 and an opposed stop 27, as shown in FIGS. 11 and 12, so that the handle may readily slipped endwise into place and retained thereon, but may be removed by manually engaging and flexing the latch finger 26.

References now directed to the embodiment of the fastener shown in FIGS. 13 through 22. This embodiment includes a grommet 28, the parts of which are similar to the grommet 1 and similarly identified except as indicated. In place of the bosses 9, laterally overlapping the retainer bosses 29 are provided.

Similarly, this embodiment includes a stud 30 the parts of which are similar to the stud 12, except that the annular retainer groove 17 is omited and the extremity of the shank 15 is provided with a square or circular extension 31 protruding beyond the rectangular end 19 and terminating in laterally extending projections 32.

Operation of the embodiment shown in FIGS. 13 through 22 is as follows:

When the stud 30 is severed from the grommet 28, as in the first described embodiment, the stud moves axially or downward. During final downward movement the projections 32 pass between the retainer bosses 29 to spread the bosses so as to permit the projections 32 to pass. Once the projections are beyond the bosses 29 the stud cannot be withdrawn from the grommet, but may be rotated to expand and contract the stems 5 as in the first described embodiment.

It will be noted that the major axis defined by the projections 32 is at right angles to the major axis of the rectangular portion 19, so that the initial movement of the stud merely expands the stems 5 temporarily as indicated by the arrows in FIG. 15, subsequent 90° rotation of the studs being required to secure the grommet as shown in FIG. 16. If desired the major axis of the projections 32 and the rectangular portion 19 may be in alignment so that initial securing of the grommet may be attained with a single thrusting movement of the stud as in the first described embodiment.

Having fully described my invention it is to be understood that I am not to be limited to the details herein set forth, but that my invention is of the full scope of the appended claims.

I claim:

1. A fastener for detachably securing a pair of members having mating perforations shaped to receive the fastener, said fastener comprising:
   a. a grommet including a head having an opening therethrough and a pair of spreadable essentially parallel stems extending axially from opposite sides of the opening for insertion through the mating perforations;
   b. and a stud including a head and a shank, the shank being insertable through the grommet head opening and between the stems;
   c. The sides of the shank and grommet stems having mutually engageable means operable, on relative turning movement of the stud and grommet, to spread the stems apart for interlocking engagement with the margins of the mating perforations in the members;
   d. a pair of laterally offset yieldable fingers extending inwardly from the stems along respectively opposite sides of a shank therebetween;
   e. and restraining means on said shank engageable by the fingers to prevent retraction of the stud from the grommet once the stud has been inserted therein.

2. A fastener, as defined in claim 1, wherein:
   a. the yieldable fingers are located adjacent the juncture between the stud head and shank and the restraining means is an annular channel formed in the shank.

3. A fastener as defined in claim 1, wherein:
   a. the yieldable fingers are located at the extremities of the stems, and the restraining means is a mating pair of projections at the extremity of the shank.

4. A fastener as defined in claim 1 wherein:
   a. the extremity of the stud shank is initially attached to the head of the grommet by frangible connections at opposite sides of the entrance end of the head opening.

5. A fastener, as defined in claim 4, wherein:
   a. the major transverse portion is initially operable on axial movement of the stud shank to effect interlocking engagement with the margins of the perforations in the members.

6. A fastener, as defined in claim 1, wherein:
   a. a turning handle is provided;
   b. and the stud head and turning handle are provided with releasable interconnecting means to secure the turning handle to the stud head.

7. A fastener for detachably securing a first and a second member having aligned non-circular perforations, said fastener comprising:
 a. a grommet including a head having an opening therethrough and a pair of spreadable essentially parallel stems extending axially and having opposed inner and generally parallel flat faces and defining a non-circular figure slidably receivable in the perforations;
 b. and a stud including a head and a shank, the shank being insertable through the grommet head opening and between the stems, the shank being provided with a substantially flat-faced rectangular stem spreader element having a minor transverse portion and a major transverse portion in essentially ninety degree relation; the minor transverse portion, when positioned with its flat faces confronting the flat faces of the stems, permitting insertion or withdrawal of the grommet; the major transverse portion being operable, on turning the stud to force the stems into interlocking engagement with opposite margins of the perforations in the first and second members with the flat faces of said major transverse portion engaging said flat faces of said stems.

8. A fastener, as defined in claim 7, including:
 a. restraining means comprising an annular channel formed in the stud shank adjacent the stud head; and a pair of deflectable tabs projecting inwardly between the stems in tangential relation to the annular channel.

9. A fastener, as defined in claim 7, including
 a. restraining means comprising inward projections at the extremities of the stems, and an axial extension on the stud shank.

10. A fastener, as defined in claim 7, wherein:
 a. the extremity of the stud shank is initially integerally attached to the head of the grommet by frangible connections at the entrance end of the head opening.

11. A fastener, as defined in claim 7, wherein:
 a. the stud head is provided with a transverse slot having undercut side portions;
 b. turning handle having side ribs is slidably received in the transverse slot;
 c. and a latch means is provided to secure the turning handle to the stud head.

12. An initially single piece fastener for detachably securing a first and second member having mating quadrilateral perforations, said fastener comprising;
 a. a grommet including a head having a circular opening therethrough and a pair of spreadable stems having free-end extremities normally extending in essentially parallel relation and defining a quadrilateral figure slidably received in the perforations; the extremities of the stems forming, at their confronting sides, converging cam surfaces terminating in confronting parallel bearing faces;
 b. and a stud including a head and a shank attached integrally in a limited area to the grommet head, the stud upon being severed, being movable through the grommet opening and between the stems, the shank having a stem spreading element forming a portion of minor width and a portion of major width movable into the space between the bearing faces, the shank having its major width portion oriented in a direction perpendicular to said converging cam surfaces for axial movement of its major width portion between the bearing faces whereby initial movement of the stud causes the bearing faces to spread without rotation of the stud, the stud having a portion rotatable in said opening and being subsequently rotatable for alternate placement of the minor width portions and the major width portions in engagement with the bearing faces to release or engage the perforation of at least one of the members.

13. A fastener, as defined in claim 12, wherein:
 a. the stud shank and grommet stems include means mutually engageable upon initial insertion of the stud shank between the grommet stems to restrain the stud and grommet against subsequent disengagement, but permitting relative rotation.

14. A fastener, as defined in claim 12, wherein:
 a. the head is provided with a laterally undercut cross slot;
 b. a turning handle having side flanges is is slidably received in the cross slot, the turning handle including a stop and latch finger engageable with opposite ends of the slot to retain the turning handle on the stud head.

* * * * *